United States Patent
Narasinghanallur et al.

(10) Patent No.: US 8,549,038 B2
(45) Date of Patent: Oct. 1, 2013

(54) PLUGGABLE SESSION CONTEXT

(75) Inventors: Janaki Narasinghanallur, San Ramon, CA (US); Min-Hank Ho, Newark, CA (US); Eric Sedlar, Portola Valley, CA (US); Thomas Keefe, Mill Valley, CA (US); Chon Hei Lei, Alameda, CA (US); Vikram Pesati, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 670 days.

(21) Appl. No.: 12/484,977

(22) Filed: Jun. 15, 2009

(65) Prior Publication Data

US 2010/0318570 A1     Dec. 16, 2010

(51) Int. Cl.
G06F 21/00     (2013.01)
G06F 7/00      (2006.01)

(52) U.S. Cl.
USPC .......................................... 707/781; 707/703

(58) Field of Classification Search
None
See application file for complete search history.

(56) References Cited

U.S. PATENT DOCUMENTS

| | | |
|---|---|---|
| 4,586,134 A | 4/1986 | Norstedt |
| 4,644,528 A | 2/1987 | Ahmad et al. |
| 4,823,122 A | 4/1989 | Mann et al. |
| 5,047,922 A | 9/1991 | Borkar |
| 5,247,671 A | 9/1993 | Adkins et al. |
| 5,289,461 A | 2/1994 | De Nijs |
| 5,319,754 A | 6/1994 | Meinecke et al. |
| 5,392,285 A | 2/1995 | Kurts |
| 5,448,559 A | 9/1995 | Hayter et al. |
| 5,530,905 A | 6/1996 | Nichols et al. |
| 5,553,239 A | 9/1996 | Heath et al. |
| 5,553,242 A | 9/1996 | Russell et al. |
| 5,596,745 A | 1/1997 | Lai et al. |
| 5,598,536 A | 1/1997 | Slaughter, III et al. |
| 5,600,722 A | 2/1997 | Yamaguchi et al. |
| 5,600,791 A | 2/1997 | Carlson et al. |
| 5,617,540 A | 4/1997 | Civanlar et al. |
| 5,633,861 A | 5/1997 | Hanson et al. |
| 5,642,515 A | 6/1997 | Jones et al. |
| 5,682,534 A | 10/1997 | Kapoor et al. |
| 5,684,800 A | 11/1997 | Dobbins et al. |
| 5,734,659 A | 3/1998 | Mann et al. |
| 5,740,175 A | 4/1998 | Wakeman et al. |
| 5,761,507 A | 6/1998 | Govett |
| 5,771,349 A | 6/1998 | Picazo, Jr. et al. |
| 5,774,660 A | 6/1998 | Brendel et al. |
| 5,774,668 A | 6/1998 | Choquier et al. |
| 5,790,800 A | 8/1998 | Gauvin et al. |
| 5,805,816 A | 9/1998 | Picazo, Jr. et al. |
| 5,805,827 A | 9/1998 | Chau et al. |
| 5,805,920 A | 9/1998 | Sprenkle et al. |

(Continued)

*Primary Examiner* — Charles Kim
*Assistant Examiner* — Miranda Huang
(74) *Attorney, Agent, or Firm* — Hickman Palermo Truong Becker Bingham Wong LLP

(57) ABSTRACT

A method and apparatus are described for sharing a session to access a database. A database server receives, in a session, a session context identifier and a command. The session context identifier identifies a session context to use for the session. The session context is a set of information or commands that plug into a session state and specify how commands in the session are to be performed for a particular user or privilege level. In response to receiving the identifier, the database server associates the session context with the database session for the connection. The database server uses the session context to process the command. The session context may then be detached from the session, allowing another user to attach to the session via another session context.

48 Claims, 5 Drawing Sheets

(56) References Cited

U.S. PATENT DOCUMENTS

| | | |
|---|---|---|
| 5,828,879 A | 10/1998 | Bennett |
| 5,944,823 A | 8/1999 | Jade et al. |
| 5,963,556 A | 10/1999 | Varghese et al. |
| 5,974,463 A | 10/1999 | Warrier et al. |
| 5,978,849 A | 11/1999 | Khanna |
| 5,987,430 A | 11/1999 | Van Horne et al. |
| 6,006,264 A | 12/1999 | Colby et al. |
| 6,088,728 A | 7/2000 | Bellemore et al. |
| 6,138,120 A * | 10/2000 | Gongwer et al. ............ 1/1 |
| 6,310,883 B1 | 10/2001 | Mann et al. |
| 6,321,235 B1 | 11/2001 | Bird |
| 6,950,848 B1 | 9/2005 | Yousefi'zadeh |
| 7,039,654 B1 | 5/2006 | Eder |
| 7,136,825 B2 | 11/2006 | Araki et al. |
| 7,174,379 B2 | 2/2007 | Agarwal et al. |
| 7,346,690 B1 | 3/2008 | Sinha et al. |
| 7,506,034 B2 | 3/2009 | Coates et al. |
| 7,512,686 B2 | 3/2009 | Berg |
| 2001/0027406 A1 | 10/2001 | Araki et al. |
| 2002/0147652 A1 * | 10/2002 | Gheith et al. ............ 705/26 |
| 2003/0065986 A1 | 4/2003 | Fraenkel et al. |
| 2003/0081748 A1 | 5/2003 | Lipinski |
| 2003/0172145 A1 | 9/2003 | Nguyen |
| 2003/0208523 A1 | 11/2003 | Gopalan et al. |
| 2003/0229695 A1 | 12/2003 | Mc Bride |
| 2004/0030801 A1 | 2/2004 | Moran et al. |
| 2004/0117375 A1 | 6/2004 | Saha et al. |
| 2004/0176996 A1 | 9/2004 | Powers et al. |
| 2004/0205101 A1 | 10/2004 | Radhakrishnan |
| 2004/0221031 A1 | 11/2004 | Desai |
| 2004/0257985 A1 | 12/2004 | Sahai et al. |
| 2005/0038833 A1 | 2/2005 | Colrain et al. |
| 2005/0050116 A1 | 3/2005 | Gross et al. |
| 2005/0262183 A1 | 11/2005 | Colrain et al. |
| 2008/0027769 A1 | 1/2008 | Eder |
| 2008/0155688 A1 * | 6/2008 | Casazza ............ 726/21 |

* cited by examiner

PLUGGABLE SESSION CONTEXT

RELATED APPLICATIONS

The present application is related to U.S. Pat. No. 6,088,728, entitled System Using Session Data Stored In Session Data Storage For Associating And Disassociating User Identifiers For Switching Client Sessions In A Server, filed by John Bellemore, Debashish Chatterjee, and Amit Jasuja on Jun. 11, 1997, the entire contents of which are incorporated herein by reference.

The present application is also related to U.S. Patent application No. 2005/0262183, entitled Connection Pool Use Of Runtime Load Balancing Service Performance Advisories, filed by Carol L. Colrain, Rajkumar A. Irudayaraj, and Douglas N. Surber on Jun. 27, 2005, the entire contents of which are incorporated herein by reference.

Other applications or patents that may be related to the present application include: (1) U.S. Patent application No. 2005/0038833, entitled Managing Workload By Service, filed by Carol L. Colrain and Daniel Semler on Aug. 12, 2004; (2) U.S. patent application Ser. No. 10/426,824, entitled Method And Apparatus Using Connection Pools In Communication Networks, filed by Arun K. Desai on Apr. 29, 2003; and (3) U.S. Pat. No. 7,346,690, entitled Deferred Piggybacked Messaging Mechanism For Session Reuse, filed by Bipul Sinha, Amit Ganesh, and Lakshminarayanan Chidambaran on May 30, 2002. The entire contents of each of these three applications or patents are incorporated herein by reference.

FIELD OF THE INVENTION

The present invention relates generally to software, and more specifically to techniques for accessing a database on behalf of a user.

BACKGROUND

Most companies use computers to manage business and financial records. Large databases and various programs are used to keep track of all the information required for companies to do business. In the last decade the information that is stored as part of the databases has become accessible from the Internet and Intranet through Web-based applications. These applications dynamically generate a series of Web documents in a standard format supported by common browsers. Web-based applications are built using three-tiers: browser client, middle-tier application server and database server. The Web browser sends requests to the middle tier. The middle-tier services the request after accessing the database server with queries and updates.

An end user accesses a database through an application that is deployed on a middle tier. When the end user accesses the database through the application, the end user is authenticated by the application or middle tier service like SSO. Authentication credentials may include a username, password, SSL certificate, Kerberos ticket, or any other credentials that may be used to validate the identity of the end user. The application connects to the database server as a highly privileged application user acting on behalf of the end user, regardless of whether the end user is highly privileged or lowly privileged. When connecting as a highly privileged application user, the application establishes a session for the highly privileged application user. In one technique, the application may receive a query from a lowly privileged end user, query the database server in a session created for the highly privileged application user, receive a set of results from the database server that includes highly privileged data and lowly privileged data, and remove the highly privileged data from the results before sending the results to the end user. In this technique, the identity of the end user is unknown to the database, and security is enforced only in the application that is deployed on the middle tier.

Database Sessions

A session, such as a database session, is a particular connection established for a client to a server, such as a database instance, through which the client issues a series of requests (e.g., requests for execution of database statements). The database server may maintain session state data about the session. The session state data reflects the current state of the database session and may contain the identity of the client for which the session is established, services used by the client, instances of object types, language and character set data, statistics about resource usage for the session, temporary variable values generated by processes executing software within the database session, and storage for cursors and variables and other information. The current state of the database session is all of the session state data associated with a port. Subsequent commands received over the port are assumed by the server to be associated with all of the session state data associated with the port until such session is terminated. When the session is terminated, the session state data is deleted. When a new session is established on the port, the client determines new session state data to use for the new session and directs the database server to load the new session state data for the new session.

Connections are mechanisms for enabling sessions. A connection may refer to either a physical mechanism, such as a physical port, or a logical connection mechanism, or both. Often, there is a one-to-one mapping of logical connections to physical connections; however, it is possible to have more than one logical connection associated with a single physical connection or more than one physical connection associated with a single logical connection.

The session, process, and port are associated with each other. The process looks to the data in the session data storage corresponding to the process to execute the commands it receives. When the user logs out, the process is terminated, and other users may log into the server using the same port as was previously used, establish a connection, process, and session on the server, and send commands to the server for execution.

The server software may limit access to information based on the user identifier stored in the session data storage corresponding to the process accepting the command. For example, a user of database server software may have no access to one set of data, read-only access to a second set of data, and read and write access to a third set of data.

Each connection between the server and the clients requires resources on the server such as memory to manage the process and the connection associated with the session. Even a user that maintains a session without requesting the server to perform any action uses these resources. In order to conserve these resources, some operating systems running in the computer that runs the server software impose a limit on the number of connections that may be simultaneously maintained. Other operating systems may not impose a limit on the number of such connections, but a large number of connections over which sessions are established can hinder the other processes on the server which have to run using the remaining resources.

Some users that do not perform many transactions with the server may wish to have the client that they use continuously maintain a session with the server even during periods in which they will not be communicating with the server, because it is cumbersome or expensive to establish a connection with the server, thus establishing the session takes time and resources that the user may wish to expend no more than necessary. Because such users utilize resources of the server maintaining the session and the associated process and connection, they may either prevent other users from accessing the limited number of connections allowed by the operating system, or needlessly tie up resources of the server, reducing resources available to the other active or potential users of the server.

Database servers would benefit by providing an efficient and secure technique for allowing multiple users to utilize the same client-server connection.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
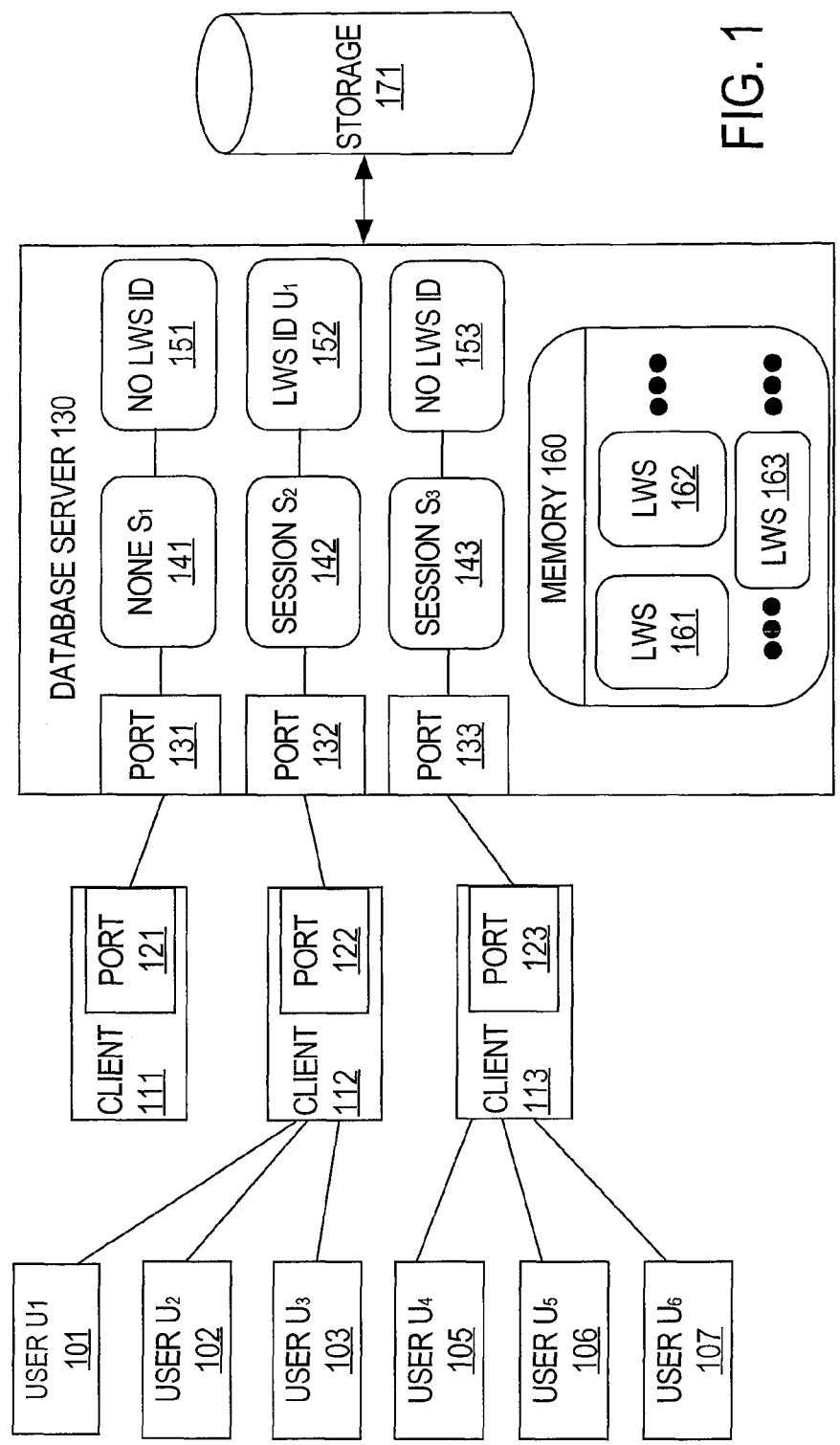
FIG. 1 is a diagram illustrating an exemplary system with a session context attached to a session.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein for accessing a database on behalf of a user among a plurality of users that share one or more sessions. In one embodiment, a client such as a Web server allows a user to access a database in a session such as a new or an existing session. The client indicates that a particular pluggable session context is to be used in the session.

A database session that is used to connect to the database contains two types of information: a first type of information, termed a "common context," that do not depend directly from the user, application, and/or privilege level, and a second type of information, termed a "pluggable session context," that directly depends on the end user, the application, and/or the privilege level. The common context may include information such as state used to compute queries, cursor maintenance information, query optimizer information, transaction management information, temporary variable storage, and other information that is independent of the user, application, and/or privilege level.

The pluggable session context varies from user to user, application to application, and/or privilege level to privilege level. The pluggable session context may be much more variant, changing as tasks are performed for a particular user, a particular application, and/or a particular privilege level. If there is a pool of sessions established with the common context set when an end-user requests to access the database, a session from the pool can be prepared for the end-user by plugging in the pluggable session context into the session without modifying or replacing the common context. In another embodiment, part or all of the common context is reset or deleted.

In one embodiment, the pluggable session context includes user-specific information such as a name or identifier for the user or of a group to which the user belongs. In the same embodiment or in a different embodiment, the pluggable session context includes application-specific information such as a set of data items that were recently viewed or a set of queries that were recently performed. In the same embodiment or in a different embodiment, the pluggable session context includes information about security privileges such as a list of roles enabled in the session and privileges granted to a user. In the same embodiment or in a different embodiment, the pluggable session context includes other information that may be plugged into a database session when a user of the database session changes from a first user to a second user.

When a user submits a request to access the database, the client selects a pluggable session context identifier that indicates a particular pluggable session context to use for that user. The pluggable session context includes a user context, an application context, and/or a security context that specifies user-specific, application-specific, role-specific, or group-specific information. The pluggable session context is attached, or plugged in, to an existing session or a new session to form a user-specific, application-specific, role-specific, or group-specific session without modifying or replacing the common context of the session. The database server executes the instructions to access the database with the common context and the pluggable session context.

There are two types of common context, each of which does not depend directly on the user, application, and/or privilege level. A first type of common context includes information that is disallowed to one or more users, applications, and/or privilege levels. In one embodiment, the first type of common context includes information that is allowed to most users, applications, and/or privilege levels. A second type of common context includes public information. In one embodiment, the database server checks the common context of the first type before executing the instructions to access the database with the common context. The common context of the first type is checked for information that is not allowed to be used for the particular pluggable session context to be used when executing the instructions. If a part of the common context is disallowed for use with the particular pluggable session context, then the database server deletes this part of the common context. In another embodiment, the database server deletes the entire common context. In yet another embodiment, the database server sets all or part of the common context to a default common context in response to determining that a part of the common context is not allowed for use with the particular pluggable session context.

The client sends a database server the session context identifier and a command in the database session. In response to receiving the session context identifier, the database server associates the user's pluggable session context with the database session. The database server uses the application context and/or the security context to process the command. In one embodiment, the database server restricts or bars access to a first set of data and allows access to a second set of data based on the security context. If the security context indicates that the user belongs to a role that does not have access to a set of data, then the database server executes a command without privilege to access the set of data by restricting, preventing, or barring access to the set of data while executing the remainder of the command that does not require access to the set of data. On the other hand, if the security context indicates that the user belongs to a role that does have access to the set of data, then the database server allows access to the set of data by executing the command and accessing the set of data.

In another embodiment, the database server applies a particular view based on the application context. If an attached session context associated with a first user specifies a first view, then the database server executes commands in the session according to the first view. If a session context associated with a second user, specifying a second view, is attached to the session, then the database server executes commands in the session according to the second view.

In one embodiment, the pluggable session context is detached after results are returned to the client. In another embodiment, the pluggable session context is detached in response to receiving a detach command from the client. The pluggable session context may also be terminated, or deleted from memory, in response to a command from the client or a lapse of time.

In one embodiment, a database server receives a first session context identifier and a first command in a database session. The first session context identifier is associated with a first session context that stores information that indicates that a first user does not have privilege to access a set of data. The database server responds to the first command without privilege to access a set of data in a database. The database server then receives, in the database session, a second session context identifier and a second command. The second identifier is associated with a second session context that stores information that indicates a user has privilege to access the set of data. In response to receiving the second identifier, the database server attaches the second session context to the database session. Then, the database server accesses the set of data to execute the second command.

Session Managers

Session managers allow more users to use a server than the number of connections established with the server. A session manager acts to the server like one or more clients and acts to the clients like one or more servers, allowing its insertion between the clients and the server without modification of the clients or the server. The session manager establishes one or more sessions with the server with full security access privileges using a user identifier and a password of the session manager. Each of the sessions is therefore "owned" by the session manager. The session manager receives queries or other commands from the clients, passes the commands over one of its connections to the server, accepts any results of the commands from the server, and passes the results to the initiating client. Because the session manager is capable of switching the commands received from the clients over a smaller number of connections with the server, the session manager can be connected to more clients than the number of connections occupied on the server. A single connection between the session manager and the server may handle commands from multiple clients.

However, because the session manager must have security privileges on the server for at least all of the clients from which it may receive commands, and the connection is "owned" by the session manager, the server is never informed of the identity of the user of the client, or that sent the command the server receives. Thus, the server is unable to restrict data access according to the identity of the user.

The session manager may itself perform the security functions that were performed by the server. The session manager may perform these functions by requiring the user to establish a session with the session manager similar to the procedure for establishing a session with the server described above. Because the session manager is aware of the user identifier of the user that sends any command, the session manager can maintain its own data access information and refuse to pass to the server a query or other command sent by a user without the proper access privileges. However, because there may be numerous session managers coupled to each server, administration of security access can be made more complex than the centralized approach of administering security on the server. In addition, the session manager may not be able to provide all of the security features of the server. The principle of least privilege is violated by allowing the session manager complete access to the database even when commands originate from a less privileged user. Thus logical errors in the application code can produce security vulnerabilities.

Furthermore, when new security features become available on the server, the owner of the system is required to update the software in the session manager to gain access to these new features if such features can be obtained from the session manager at all.

The database server may be installed on a machine with a volatile or non-volatile computer-readable storage medium storing one or more sequences of instruction. The one or more sequences of instruction are executed by one or more processors on the machine, causing the one or more processors to install and run the database server.

A database appliance is a machine that utilizes a database server to access a database. The database appliance includes one or more processors and executes instructions to run the database server.

In another embodiment, a session manager is connected between one or more ports of one or more database servers and multiple clients. The session manager directs a database server to initiate sessions with clients to which it is attached. When the session manager receives queries or other commands from a client requesting a new connection, the session manager directs the server to delete all current session state data associated with a port. The database server deletes all current session state data associated with the port. The session manager then directs the database server to use new session state data for the port. The database server loads new session state data and associates the new session state data with the port. The session manager then sends the queries or other commands from the client to the database server. The database server processes the command according to the session state associated with the port.

To end a previous session, database server deletes all session state data associated with the port. To load the new session, the database server loads the session state data identified by the client. Then, a client-side application performs a validation step to ensure that the newly loaded session state data is correct.

The database server can use the session state data associated with the connection to determine if and how to process the query and any subsequent query over the same connection, until the connection is terminated. Under this embodiment, the identity of the user is available to the database server for security access purposes.

Although the session manager allows the database server to ascertain the identity of the user, the session manager creates inefficiencies in the process of allowing a client to use an existing connection. In order to use an existing connection, all previous session state data is deleted, and new session state data is loaded. The step of ending a previous session and starting a new session can be costly (i.e., time consuming and inefficient) for the database server. Accordingly, the session manager approach is inefficient when multiple clients utilize a single connection to a database server.

Pluggable Session Context

Instead of using a different session for each user, the database server may use a pluggable session context to store in memory an application context and/or a security context for the user. In order to allow a first user to use a connection, the database server plugs the session context for the first user into the session. Then, the database server may allow a second user to use the connection by plugging in the session context for the second user into the session, replacing the session context for the first user. Plugging in the session context is more efficient than clearing or deleting the entire session and loading a new session. Whenever the second user begins using the connection, the session context is plugged in without affecting other session information that is not related to the user, such as the allocation of memory, cursor maintenance information, PL/SQL global information, information used to process queries, query optimizer information, and transaction management information.

In one embodiment, a first user logs onto a client that is displayed to the first user in a browser. The client sends a first identifier and a first command to a database server in a database session. The first identifier is associated with a first session context that stores information that indicates that the first user does not have privilege to access a set of data in a database. The database server processes the first command and sends a first result to the client. The result received by the client is generated without privilege to access the set of data. The client receives a user input from a second user through a Web interface that is displayed to the second user in a browser, and the client authenticates the second user. The client sends a second identifier and a second command to the database server in the same database session. The second identifier is associated with a second session context that stores information that indicates that the second user has privilege to access the set of data. The database server processes the second command and sends a second result to the client. The second result is generated at least in part by accessing the set of data.

FIG. 1 illustrates an exemplary system with a session context attached to a session. In FIG. 1, Users $U_1$ through $U_6$ (items 101-106) are each logged into a client of clients 111-113. Specifically, User $U_1$ (item 101) is logged into client 111. Each of clients 111-113 communicates with database server 130 from a port of client ports 121-123 to a port of database server ports 131-133. For example, client 112 communicates with database server 130 from client port 122 to database server port 132. In one embodiment, multiple clients share a database server port.

Database server 130 stores session information identifying to which session the connection on port 132 belongs. As shown, database server 130 stores information indicating that session $S_2$ is used for the connection on port 132. Database 130 also stores session context information, such as a session context identifier, also called a "Lightweight Session Identifier" or "LWS ID", for each session that has been associated with a pluggable session context. As shown, session $S_2$ is associated with LWS ID $U_1$. In one embodiment, LWS ID $U_1$ is a reference to session context information for user $U_1$ (item 161) in memory 160 of database server 130. In another embodiment, the session context identifier is a cookie. The cookie may be set by the client. The cookie may include information that identifies a particular user, and/or the cookie may include a reference to the session context information.

Database server 130 utilizes session contexts (items 161-163, also called "Lightweight Sessions" or "LWS") in memory 160 in order to execute commands on storage 171, such as a hard disk storing a database. In one embodiment, when executing a command from user $U_1$, database server 130 uses session context information 161 to determine whether user $U_1$ has access to a set of data on storage 171.

As shown, no session context (item 153) is attached to session $S_3$ (item 143). In one embodiment, client 113 receives user input from user $U_4$ (item 104). Client 113 sends a session context identifier for user $U_4$ from port 123 to port 133. Database server 130 receives the session context identifier and stores a reference to session context information for user $U_4$ in item 153, not shown. After the reference is stored, the session context for user $U_4$ is said to be attached to session $S_3$ (item 143). Database server 130 may then execute commands on storage 171 utilizing the session context information for user $U_4$ (item 162).

Also as shown, the session context for user $U_1$ is attached to session $S_2$ (item 142). In one embodiment, client 112 receives a command from user $U_2$. Client 112 sends a LWS ID for user $U_2$ and the command to database server 130 in session $S_2$ (item 142). In response to receiving the LWS ID for user $U_2$, database server 130 detaches the session context for user $U_1$ and attaches a session context for user $U_2$, storing a reference to session context information for user $U_2$ in item 152, not shown. After the reference is stored, the session context for user $U_1$ is said to be detached from session $S_2$ (item 142), and the session context for user $U_2$ is said to be attached to session $S_2$ (item 142). Database server 130 may then execute commands on storage 171 utilizing the session context information for user $U_2$ (item 163).

Application Context

According to one embodiment, the application context includes a set of namespaces that have been defined for a user. For example, a database server may return a particular view for the user because the user is in a certain sales region. The application context contains key-value pairs. In the example, the application context may be queried as follows:

SQL> select NAMESPACE_NAME, ATTRIBUTE_NAME, ATTRIBUTE_VALUE from SESSION_NS_ATTRIBUTES order by NAMESPACE_NAME,ATTRIBUTE_NAME;

In one embodiment, the query of the application context produces a result as follows:

| NAMESPACE_NAME | ATTRIBUTE_NAME | ATTRIBUTE_VALUE |
|---|---|---|
| SALES | Region | NW |
| FINANCE | Currency | USD |

In the result, the user is identified as being in the NW (Northwest) sales region. Also, the user is identified as using USD as currency under the Finance category. Here, the key is a combination of NAMESPACE_NAME and ATTRIBUTE_NAME. The value is ATTRIBUTE_VALUE. For example, the key "SALES.Region" has the value "NW", and the key "FINANCE.Currency" has the value "USD". Any key-value pair may be defined for the user and stored in the application context, using any combination of namespace names, attribute names, and attribute values.

Once the session context is attached to the session, the user-specific information in the application context may be used to make determinations such as the appropriate view for the user. In the example, users of the Northwest sales region may get one view, and users of the Southwest sales region may get another view. In another embodiment, users that use currency USD might see data in different units than users that use currency YEN.

Security Context

The security context includes a list of roles or security parameters enabled for the user. Roles are used by the database server and/or applications when evaluating queries to determine whether to provide the user with access to a set of data.

For example, a user may have a role enabled that allows access to a first set of data but not to a second set of data. When the database server evaluates a first command from a user to access the first set of data from a database, the database server would allow access. On the other hand, the database server would restrict, or disallow, access to the second set of data in response to a second command that attempts to access the second set of data. In another example, the database server evaluates a third command that attempts to access the first set of data and the second set of data. The third command is evaluated to provide a result that includes the first set of data but excludes the second set of data.

A given user may have a number of roles enabled. For example, the user may be a manager, an employee, and an administrator. The managerial role provides the user with a high level of access. The employee role provides the user with a low level of access, and the administrator role provides the user with a very high level of access. The user may elect to have certain roles enabled or disabled at any given time.

In one example, the security context may be queried in order to determine which roles are enabled for a given user, as follows:

SQL>select role from session_roles order by 1;

In one embodiment, the query of the security context produces a result as follows:

| ROLE |
|---|
| d1 |
| r1 |
| r11 |
| r111 |
| r12 |
| r121 |
| public |

In the result, the user is identified as being part of several different roles. In one embodiment, the role "d1" indicates that the user has administrative-level access, and the role "public" indicates that the user has public-level access. If only the public role is enabled, then the user has minimal access, only to the portions of the database that are open to the public.

In a particular embodiment, role "r1" may indicate that the user has access to a first set of data but not to a second set of data, to all data, to multiple sets of data, or to no data or only public data. In another embodiment, a session that is not associated with a pluggable session context at all has no access to data or only access to public data. In this manner, the database server maintains a least-privileged user level of access.

Creating a Session Context

A session context is plugged in, or attached, in response to a request from a user or client to attach a session context associated with the user to the session. In one embodiment, a client such as a Web server authenticates a user. Then, the client initiates a pluggable session context on behalf of the user. In another embodiment, the user initiates the pluggable session context. If a session context exists for the user, the session context may be loaded from disk or read from memory. In one embodiment, the database server keeps a copy of session context information in memory for all active users.

In one embodiment, a new session context may be created if a session context does not exist for the user. In one embodiment, the database administrator, the database server, or the client creates a session context for the user, identifying the roles to which the user belongs. In another embodiment, a session context with limited privileges is created if no session context exists for the user. The limited privileges may be expanded by the client or by the database administrator. In another embodiment, the user creates a session context and has access to information loaded by the user and/or public information. In another embodiment, the user is denied access if the user has no security context defined by the database administrator. In yet another embodiment, an error occurs when a user without a session context attempts to use a session.

Figure 2:
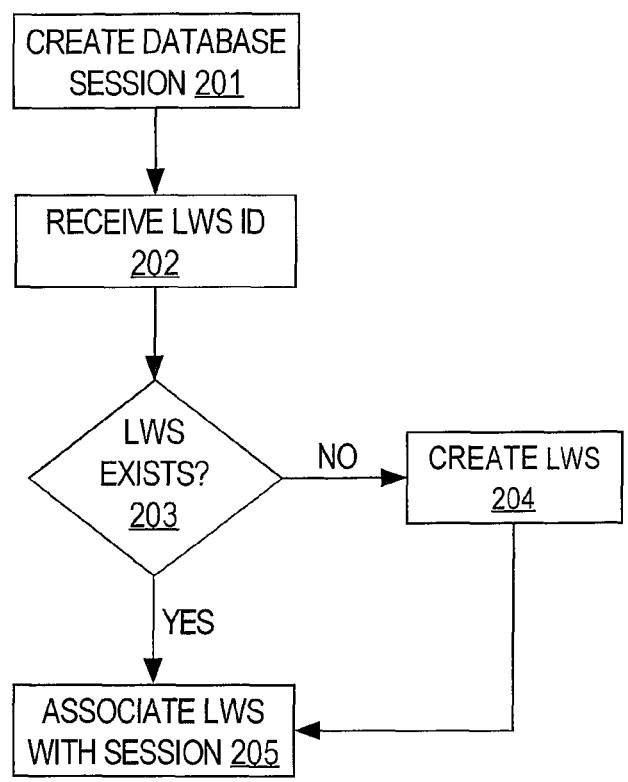
FIG. 2 is a flowchart illustrating a technique for attaching a session context to a new session.

Referring to FIG. 2, a database session is initially created in step 201. In the example, the database session has no session context (also called "Lightweight Session," or "LWS") attached. In step 202, the database server receives a session context identifier from the client. The database server determines whether the session context identifier matches an existing session context in step 203. In one embodiment as shown, a determination is made that the session context identifier does not match an existing session context, and the database server creates a session context (step 204) and associates the session context with the session (step 205). In another embodiment not shown, the database server returns an error when the session context identifier does not match an existing session context. If a session context exists, the database server attaches the session context to the session (step 205).

In one embodiment, a session is created for user 'u1' using the following command:

SQL>sessions.create_session('u1', sessionid);

Attaching and Detaching a Session Context

In one embodiment, attaching a session context involves storing a reference or pointer to the session context information that is stored in memory. Attaching, or plugging in, a session context to a session includes locating session context information based on an identifier received from the user or the client (on behalf of the user), and storing an indicator such as a reference to the session context information. In one embodiment, the indicator is a cookie set by the client, and the database server uses the cookie to reference session context information in the database server. In another embodiment, the indicator is a reference to a memory location that stores the session context information. In one embodiment, the identifier is a user identifier. In another embodiment, the identifier is a session context identifier. In one embodiment, the identifier may be specified in a cookie. In one embodiment, other session state information stays the same when a session context is plugged into the session.

When a second user requests to use the session, the database server locates a second session context based on a second identifier received from the client (on behalf of the second user) or the second user and stores an indicator that instructs the database to use the second session context for the session. In one embodiment, the indicator is a reference to the session context information in the memory of the database server. In another embodiment, the indicator is a session context identifier that is used to look up the session context information in an index. In another embodiment, the indicator is a cookie set by the client, and the database server uses the cookie to reference the session context information in the database based on information such as a user identifier or a path specified by the cookie.

When the session context is located on disk, the session context may be stored in a buffer in memory. The buffer may include recently or frequently used session contexts, or the buffer may include all session contexts. A reference to the memory location in the buffer may be stored in order to locate the session context. In one embodiment, the user obtains an exclusive lock on the session context while the session context is active. In another embodiment, the session context may be used by multiple users at the same time.

The attach step can happen in any database session or from the mid-tier through a dispatcher. In one embodiment, the session is attached to the database session with the following instruction:

SQL>sessions.attach_session(sessionid, null);

When the database server receives a command while a session context is attached, the database server executes the command in light of the application context and security context in the session context. In one embodiment, the database server determines to which sets of data a command may access based on the security context. In another embodiment, the database server determines how to return a result for the command based on the application context. The database server may return the result by sending the result in the database session to the client.

A session context for a first user may be detached when the database server receives a detach command or when the database server receives a command to attach a second user to the session. The session context may also be detached in response to information that indicates the first user is no longer active. For example, the first user may either log out or fail to issue commands for a specified period of time (timeout). In one embodiment, other session state information stays the same when a session context is detached from the session.

Figure 3:
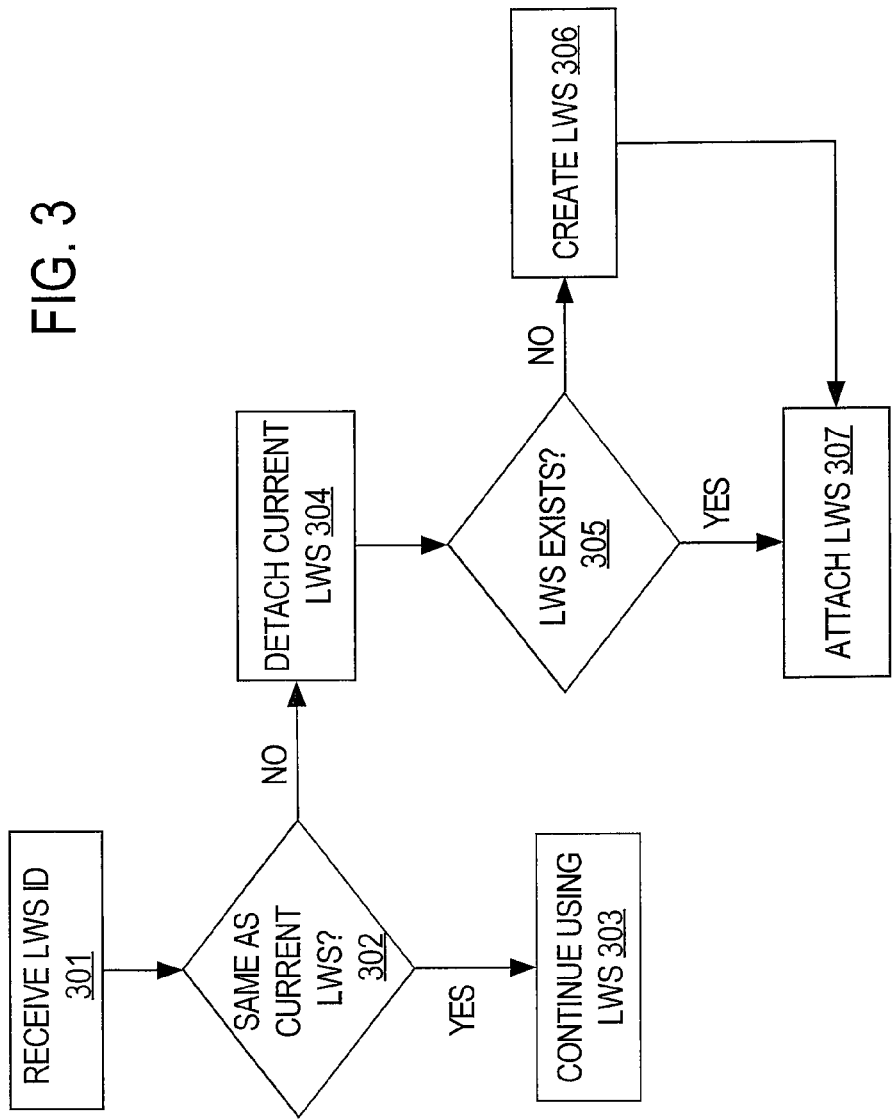
FIG. 3 is a flowchart illustrating a technique for detaching a first session context and attaching a second session context.

FIG. 3 illustrates an example of how a first session context is detached and a second session context is attached. Referring to FIG. 3, a database server receives a session context identifier ("LWS ID," as shown) from a user in step 301. In one embodiment, shown in step 302, the database server determines whether the session context identifier is the same as the currently used session context identifier. If so, then the database server continues using the session context ("LWS," as shown) according to step 303. If not, then the database server detaches the current session context (step 304) and attaches a session context matching the received session context identifier (step 307). In another embodiment not shown, the database server attaches the session context matching the session context identifier to the session regardless of whether the session context identifier is the same as the currently used session context identifier.

In order to attach a session context matching the received session context identifier (step 307), in one embodiment, as shown in steps 305 and 306, the database server may make a determination as to whether the session context exists in memory or on disk and create the session context if the session context does not exist. In another embodiment not shown, the database server returns an error when the session context identifier does not match a session context that exists in memory or on disk.

Figure 4:
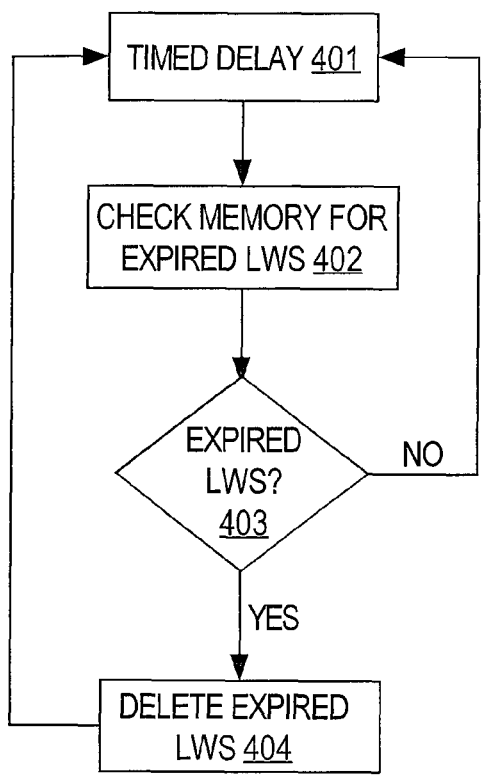
FIG. 4 is a flowchart illustrating a technique for detecting and deleting expired session contexts.

FIG. 4 illustrates an example of how the database server may check for expired session contexts. In step 402, the database server checks memory for expired session contexts. A session context ("LWS," as shown) may include information indicating the last time the session context was used, or the time in which the session context was read into memory. A determination is made in step 403 as to whether the session context has expired. If the session context has not expired, then a timed delay (step 401) occurs before the process starts over at step 402. If the session context has expired, then the session context is deleted from memory. In one embodiment, the session context is deleted from disk.

Detaching the session context includes disassociating the session context with the session. In one embodiment, a first session context for a first user is disassociated with a session so that a second session context for a second user may be associated with the session. Particularly, a reference to the second session context may replace the reference stored to the first session context.

Updating a Session Context

In one embodiment, session contexts are stored in physical shared memory so that they are accessible by both the database server and the client. In this manner, both the client and the database server may utilize the user-specific information contained in the session contexts. In one embodiment, the client and the database server both access the shared memory on the same storage device.

In another embodiment, the client and the database server each maintain a logical shared memory in separate storage devices. The client and the database server maintain a logical shared memory in separate storage devices by sending updates back and forth as the session contexts in shared memory are modified. Updates of the session context information may be sent in messages that are piggybacked to other messages using a piggyback messaging system.

In another embodiment, the one or more of the session contexts are stored in the database. In this embodiment, the client may access session context information on the database when the client is connected to the database server. In one embodiment, the client may query the database, via the database server, for session context information based on a user identifier.

In one embodiment, a change is detected in the session context on the database server. In response to detecting the change, the database server sends a message to the client indicating the change. The client receives the message indicating the change and updates the session context on the client side.

In another embodiment, a change is detected in the session context on the client side. In response to detecting the change, the client sends a message to the database server indicating the change. The database server receives the message indicating the change and updates the session context on the database server side.

Piggyback messaging systems are discussed in U.S. Pat. No. 7,346,690, entitled Deferred Piggybacked Messaging Mechanism For Session Reuse, filed by Bipul Sinha, Amit Ganesh, and Lakshminarayanan Chidambaran on May 30, 2002, which has already been incorporated by reference herein in its entirety. When an update is sent between the client and the database server, the update may be piggybacked to another message without transmitting a separate message. In one embodiment, the update is piggybacked to another message without changing the state of the session. For example, in a session attached to session context A, an update to session context B may be piggybacked to a message transmitted during the session. In one example, the message is a command executed according to session context A, and the update is a change to the application context or security context of session context B.

Terminating the Session Context

A session context may be terminated at any time. In one embodiment, the session context is terminated in response to information that indicates that the user is no longer active. In another embodiment, an infrequently used session context or a session context that has gone unused for a specified period of time is terminated.

The session context may also be terminated in response to detecting that the available memory for the database server is below a specified value. In another embodiment, the session context may be terminated in response to detecting that the amount of memory used by the session context information nears, meets, or exceeds a threshold of memory allocated for such session context information. In yet another embodiment, the session may be terminated in response to receiving a request from the user to log out.

To terminate the session context, a transient version of the session context is deleted from memory. In one embodiment, a persistent version of the session context is deleted from disk.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
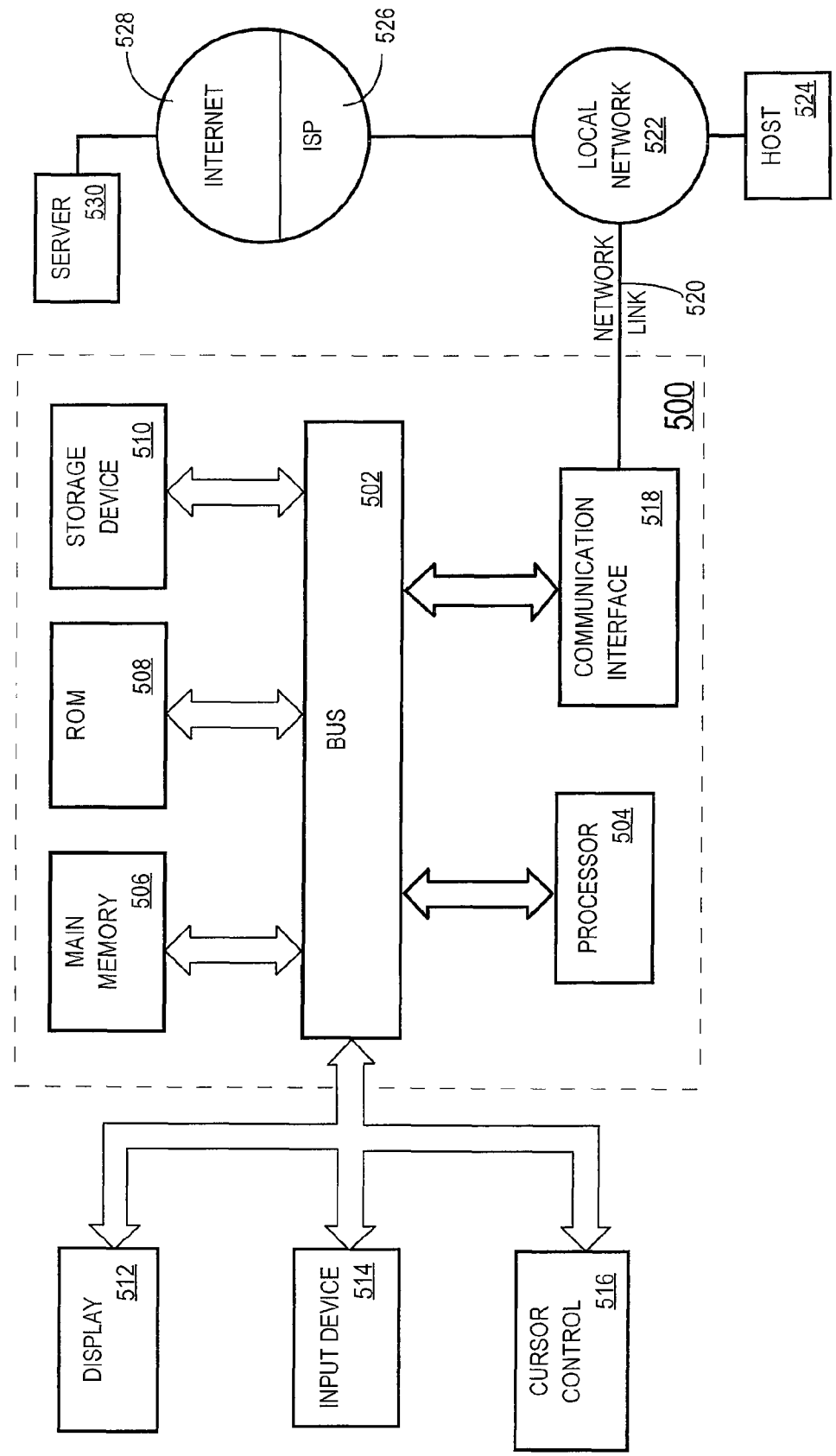
FIG. 5 is a diagram of a system upon which the techniques described herein may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine.

According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
plugging a first pluggable session context into a first database session to execute a first command in the first database session, wherein the first pluggable session context has information that changes as commands are executed for a first user or application;
receiving, in the first database session, a particular identifier and a second command;
wherein the particular identifier is associated with a second pluggable session context having information that changes as commands are executed for a second user or application;
in response to receiving the particular identifier, plugging the second pluggable session context into the first database session without modifying a first common context that existed in the first database session after executing at least the first command in the first database session, wherein the first common context includes session information that does not depend on the first user or application; using the second pluggable session context to execute the second command in the first database session;
storing the second pluggable session context such that the second pluggable session context is accessible for plugging into a second database session;
wherein the method is performed by one or more computing devices.

2. The method of claim 1, wherein
the particular identifier is a second particular identifier;
further comprising receiving a first particular identifier in the first database session;
wherein the first particular identifier is associated with the first pluggable session context;

in response to receiving the first particular identifier, the database server attaching the first pluggable session context to the first database session;

in response to receiving the second particular identifier, detaching the first pluggable session context from the first database session.

3. The method of claim 1, further comprising sending, in the first database session, a result from execution of the second command.

4. The method of claim 1, wherein the database server uses the second pluggable session context during execution of the second command, and wherein the second pluggable session context further comprises at least one of: a user identifier, attributes for an application, and security parameters.

5. The method of claim 1, wherein, before plugging the first pluggable session context or the second pluggable session context into the first database session, the first database session has no access to non-public data.

6. The method of claim 1, further comprising:
detecting a change to the second pluggable session context; and
sending, in the first database session, a message indicating the change to the second pluggable session context.

7. The method of claim 1, further comprising:
receiving, in the first database session, a change to the second pluggable session context;
updating the second pluggable session context based at least in part on the change to the second pluggable session context.

8. The method of claim 1, wherein the first database session is initiated by a client, and the first user or application is logged into the client.

9. The method of claim 1, wherein the identifier is any of:
a reference to a memory location of a database server,
a cookie including a reference to the second pluggable session context, and
a cookie including a reference to the second user or application.

10. The method of claim 1, further comprising detaching the pluggable session context from the first database session after executing the second command.

11. The method of claim 1, further comprising:
detecting that the second pluggable session context has not been used for a specified period of time;
detaching the second pluggable session context; and
deleting the second pluggable session context.

12. The method of claim 1, further comprising:
in response to the receiving the second command, determining whether the second pluggable session context exists for the second user or application; and
in response to determining that the pluggable session context does not exist, creating a second pluggable session context for the second user or application.

13. The method of claim 1, further comprising:
the database server storing, in a buffer, the second pluggable session context.

14. The method of claim 1, wherein the first common context includes at least one of:
a state used to compute queries,
cursor maintenance information,
query optimizer information,
transaction management information, and
temporary variable storage.

15. A method comprising:
receiving input from a first user or application;
identifying a particular identifier and a first command based at least in part on the input;

wherein the particular identifier is associated with a first pluggable session context having information that changes as commands are executed for the first user or application;

sending the particular identifier and the first command in a first database session in which a second pluggable session context was previously plugged in to execute a second command, wherein the second pluggable session context has information that changes as commands are executed for a second user or application;

receiving a result for the first command in the first database session;

wherein the result was generated after the first pluggable session context was plugged into the first database session and without modifying a first common context that existed after executing at least the first command in the first database session, wherein the first common context includes session information that does not depend on the first user or application;

sending the particular identifier and a third command to cause the first pluggable session context to be plugged into a second database session;

wherein the method is performed by one or more computing devices.

16. The method of claim 15, wherein
the particular identifier is a first particular identifier;
wherein the input is a first input;
further comprising:
receiving second input from the second user or application;
sending a second particular identifier and the second command in the first database session;
wherein the second particular identifier is associated with the second pluggable session context.

17. The method of claim 15, further comprising providing the second result to the first user or application.

18. The method of claim 15, wherein the database server uses the first pluggable session context during execution of the first command, and wherein the first pluggable session context further comprises at least one of: a user identifier, attributes for an application, and security parameters.

19. The method of claim 15, wherein, before the first pluggable session context or the second pluggable session context is plugged into the first database session, the first database session has no access to non-public data.

20. The method of claim 15, further comprising:
detecting a change to the first pluggable session context; and
sending, in said first database session, a message indicating the change to the first pluggable session context.

21. The method of claim 15, further comprising:
receiving, in the first database session, a change to the first pluggable session context;
updating the first pluggable session context based at least in part on the change to the first pluggable session context.

22. The method of claim 15, further comprising authenticating the first user or application based at least in part on the input.

23. The method of claim 15, wherein the first application or user is a first user, wherein the input comprises submission by the first user that is displayed to the first user in a browser.

24. The method of claim 15, further comprising:
receiving a request from the first user or application to log out; and
deleting said first pluggable session context.

25. A volatile or non-volatile computer-readable storage medium storing one or more sequences of instruction, wherein the one or more sequences of instruction, when executed by one or more processors, causes:

plugging a first pluggable session context into a first database session to execute a first command in the first database session, wherein the first pluggable session context has information that changes as commands are executed for a first user or application;

receiving, in the first database session, a particular identifier and a second command;

wherein the particular identifier is associated with a second pluggable session context having information that changes as commands are executed for a second user or application;

in response to receiving the particular identifier, plugging the second pluggable session context into the first database session without modifying a first common context that existed in the first database session after executing at least the first command in the first database session, wherein the first common context includes session information that does not depend on the first user or application; using the second pluggable session context to execute the second command in the first database session;

storing the second pluggable session context such that the second pluggable session context is accessible for plugging into a second database session.

26. The volatile or non-volatile computer-readable storage medium of claim 25, wherein the particular identifier is a second particular identifier;

wherein the one or more sequences of instruction, when executed, further cause receiving a first particular identifier in the first database session;

wherein the first particular identifier is associated with the first pluggable session context;

wherein the one or more sequences of instruction, when executed, further cause:

in response to receiving the first particular identifier, the database server attaching the first pluggable session context to the first database session;

in response to receiving the second particular identifier, detaching the first pluggable session context from the first database session.

27. The volatile or non-volatile computer-readable storage medium of claim 25, wherein the one or more sequences of instruction, when executed, further cause sending, in the first database session, a result from execution of the second command.

28. The volatile or non-volatile computer-readable storage medium of claim 25, wherein the database server uses the second pluggable session context during execution of the second command, and wherein the second pluggable session context further comprises at least one of: a user identifier, attributes for an application, and security parameters.

29. The volatile or non-volatile computer-readable storage medium of claim 25, wherein, before plugging the first pluggable session context or the second pluggable session context into the first database session, the first database session has no access to non-public data.

30. The volatile or non-volatile computer-readable storage medium of claim 25, wherein the one or more sequences of instruction, when executed, further cause:

detecting a change to the second pluggable session context; and sending, in the first database session, a message indicating the change to the second pluggable session context.

31. The volatile or non-volatile computer-readable storage medium of claim 25, wherein the one or more sequences of instruction, when executed, further cause:

receiving, in the first database session, a change to the second pluggable session context;

updating the second pluggable session context based at least in part on the change to the second pluggable session context.

32. The volatile or non-volatile computer-readable storage medium of claim 25, wherein the first database session is initiated by a client, and the first user or application is logged into the client.

33. The volatile or non-volatile computer-readable storage medium of claim 25, wherein the identifier is any of:

a reference to a memory location of a database server, a cookie including a reference to the second pluggable session context, and a cookie including a reference to the second user or application.

34. The volatile or non-volatile computer-readable storage medium of claim 25, wherein the one or more sequences of instruction, when executed, further cause detaching the pluggable session context from the first database session after executing the second command.

35. The volatile or non-volatile computer-readable storage medium of claim 25, wherein the one or more sequences of instruction, when executed, further cause:

detecting that the second pluggable session context has not been used for a specified period of time;

detaching the second pluggable session context; and deleting the second pluggable session context.

36. The volatile or non-volatile computer-readable storage medium of claim 25, wherein the one or more sequences of instruction, when executed, further cause:

in response to the receiving the second command, determining whether the second pluggable session context exists for the second user; and in response to determining that the second pluggable session context does not exist, creating a second pluggable session context for the second user.

37. The volatile or non-volatile computer-readable storage medium of claim 25, wherein the one or more sequences of instruction, when executed, further cause:

the database server storing, in a buffer, the second pluggable session context.

38. The volatile or non-volatile computer-readable storage medium of claim 25, wherein the first common context includes at least one of:

a state used to compute queries, cursor maintenance information, query optimizer information, transaction management information, and temporary variable storage.

39. A volatile or non-volatile computer-readable storage medium storing one or more sequences of instruction, wherein the one or more sequences of instruction, when executed by one or more processors, causes:

receiving input from a first user or application;

identifying a particular identifier and a first command based at least in part on the input;

wherein the particular identifier is associated with a first pluggable session context having information that changes as commands are executed for the first user or application;

sending the particular identifier and the first command in a first database session in which a second pluggable session context was previously plugged in to execute a second command, wherein the second pluggable session context has information that changes as commands are executed for a second user or application;

receiving a result for the first command in the first database session;

wherein the result was generated after the first pluggable session context was plugged into the first database session and without modifying a first common context that existed after executing at least the first command in the first database session, wherein the first common context includes session information that does not depend on the first user or application;

sending the particular identifier and a third command to cause the first pluggable session context to be plugged into a second database session.

40. The volatile or non-volatile computer-readable storage medium of claim 39, wherein:

the particular identifier is a first particular identifier;

wherein the input is a first input;

wherein the one or more sequences of instruction, when executed, further cause sending a second particular identifier and the second command in the first database session; and wherein the second particular identifier is associated with the second pluggable session context.

41. The volatile or non-volatile computer-readable storage medium of claim 39, wherein the one or more sequences of instruction, when executed, further cause providing the second result to the first user or application.

42. The volatile or non-volatile computer-readable storage medium of claim 39, wherein the database server uses the first pluggable session context during execution of the first command, and wherein the first pluggable session context further comprises at least one of: a user identifier, attributes for an application, and security parameters.

43. The volatile or non-volatile computer-readable storage medium of claim 39, wherein, before the first pluggable session context or the second pluggable session context is plugged into the first database session, has no access to non-public data.

44. The volatile or non-volatile computer-readable storage medium of claim 39, wherein the one or more sequences of instruction, when executed, further cause:

detecting a change to the first pluggable session context; and sending, in said first database session, a message indicating the change to the first pluggable session context.

45. The volatile or non-volatile computer-readable storage medium of claim 39, wherein the one or more sequences of instruction, when executed, further cause:

receiving, in the first database session, a change to the first pluggable session context;

updating the first pluggable session context based at least in part on the change to the first pluggable session context.

46. The volatile or non-volatile computer-readable storage medium of claim 39, wherein the one or more sequences of instruction, when executed, further cause the client authenticating the first user or application based at least in part on the input.

47. The volatile or non-volatile computer-readable storage medium of claim 39, wherein the first user or application is a first user, wherein the input comprises a submission by the first user that is displayed to the first user in a browser.

48. The volatile or non-volatile computer-readable storage medium of claim 39, wherein the one or more sequences of instruction, when executed, further cause:

receiving a request from the first user or application to log out; and deleting said first pluggable session context.

* * * * *